(12) United States Patent
Mayer et al.

(10) Patent No.: US 6,417,297 B1
(45) Date of Patent: Jul. 9, 2002

(54) PROCESS FOR REDUCING THE ODOR EMISSION OF AQUEOUS VINYLAROMATIC/1,3-DIENE COPOLYMER DISPERSIONS

(75) Inventors: Theo Mayer, Julbach; Peter Ball, Emmerting, both of (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 210 days.

(21) Appl. No.: 09/593,618

(22) Filed: Jun. 13, 2000

(30) Foreign Application Priority Data

Jun. 24, 1999 (DE) .......................... 199 28 934

(51) Int. Cl.⁷ .......................... C08F 6/16; C08F 212/04; C08F 289/00; C08J 3/12; C08L 25/10
(52) U.S. Cl. .......................... 526/78; 524/458; 526/79; 526/80; 526/87; 526/340
(58) Field of Search .......................... 526/340, 78, 79, 526/80, 87; 524/458

(56) References Cited

U.S. PATENT DOCUMENTS

| 3,769,251 A | * 10/1973 | Wiest et al. |
| 4,529,753 A | 7/1985 | Taylor |
| 5,708,077 A | 1/1998 | Nölken et al. |

FOREIGN PATENT DOCUMENTS

| DE | 4419518 | 12/1995 | |
| DE | 19728997 | 2/1998 | |
| DE | 19853421 | 5/2000 | |
| EP | 0327006 | 8/1989 | |
| FR | 2117526 | 7/1972 | |
| JP | 74011750 | * 3/1974 | ........... C08F/19/00 |
| WO | 98/11156 | 3/1998 | |
| WO | 99/16794 | 4/1999 | |

OTHER PUBLICATIONS

Derwent Abstract corresponding to DE 4419518 [AN : 1996–021300].
Derwent Abstract corresponding to DE 19728997 [AN: 1998–121682].
Derwent Abstract corresponding to WO 98/11156 [AN: 1998–170089].
Caplus Abstract corresponding to DE 19853421 May 25, 2000.
Derwent Abstract corresponding to WO 99/16794 [AN : 1999–2550607].

* cited by examiner

Primary Examiner—David W. Wu

(57) ABSTRACT

A process for reducing the odor emission of aqueous vinylaromatic/1,3-diene copolymer dispersions and of redispersion powders obtainable therefrom by drying, is by emulsion polymerization of a mixture containing at least one vinylaromatic and at least one 1,3-diene in the presence of one or more surfactant substances and optionally drying of the polymer dispersion obtained thereby. There are 0.01% to 15.0% by weight of one or more monomers of the branched or straight-chain alkyl esters having 1 to 8 C atoms in the alkyl radical of monounsaturated monocarboxylic or dicarboxylic acids and 0.01% to 15.0% by weight of one or more monomers based upon the vinyl esters of branched or straight-chain aliphatic carboxylic acids having 1 to 10 C atoms which are added in one step or in two successive steps toward the end of the polymerization, when the total content of free monomers in the aqueous copolymer dispersion is in the range from $\geq 0$ to $\leq 20\%$ by weight. It is also possible optionally to add the vinyl ester fraction as early as the beginning of or during the polymerization. The data in % by weight is based in each case on the polymer content of the dispersion.

15 Claims, No Drawings

PROCESS FOR REDUCING THE ODOR EMISSION OF AQUEOUS VINYLAROMATIC/1,3-DIENE COPOLYMER DISPERSIONS

BACKGROUND OF THE INVENTION

1. Field of the Invention

The present invention relates to a process for reducing the odor emission of aqueous vinylaromatic/1,3-diene copolymer dispersions and of redispersion powders which are obtainable by drying such polymer dispersions.

2. The Prior Art

Aqueous polymer dispersions based on vinylaromatic/1,3-diene copolymer dispersion and redispersion powders prepared therefrom, as a rule by spray-drying, are used in particular in the building sector as bodifiers in cement-containing and non-cement-containing, pulverulent ready-mixed formulations. One problem of such dispersions and redispersion powders is that they still contain, as a rule, volatile components having an intense odor. Examples of these volatile components include mercaptans, which serve as molecular weight regulators during polymerization, ammonia, which is used for neutralization, residual monomers, unpolymerizable impurities in the monomers, volatile reaction products of the monomers, which are formed under the reaction conditions, and volatile degradation products of the polymers. The resulting odor is found to be unpleasant both by the manufacturers and by the consumers, which is why there is a need for deodorized aqueous polymer dispersions and deodorized redispersion powders.

It is known that polymer dispersions can be deodorized by physical or chemical aftertreatment. For example, distillation processes, in particular steam distillation, and stripping with inert gases, may be mentioned as physical processes, as stated, for example, in EP-A-327006 (U.S. Pat. No. 5,708,077). The disadvantage of this process is that many dispersions are not sufficiently stable for this type of deodorization, so that coagulum formation occurs. This will necessitate expensive filtration prior to further use. A further disadvantage of the process is that, although it is capable of reducing the amount of volatile substances in the aqueous polymer dispersion, the question of disposal of the substances remains open.

It is also known that polymer dispersions can be freed from monomers having an intense odor by chemical aftertreatment. For example, DE-A 4419518 states that the level of residual monomers can be reduced chemically by free radical post polymerization with the action of redox initiator systems. U.S. Pat. No. 4,529,753 describes a process by means of which the content of residual monomers of aqueous polymer dispersions can be reduced by means of free radical post polymerization after the end of the main polymerization reaction, by the action of special free radical redox initiator systems. Such redox initiator systems comprise at least one oxidizing agent, at least one reducing agent and one or more transition metal ions occurring in different valency states.

However, the disadvantage of the processes described above is that, when used in polymer dispersions having an intense odor, such as, for example, styrene/butadiene dispersions, they can partially reduce the residual monomer content. However they cannot effectively reduce the unpleasant odor caused by styrene and byproducts having an intense odor, for example mercaptans, unpolymerizable impurities in the monomers, volatile reaction products of the monomers, and volatile degradation products of the polymers.

DE-A 19728997 describes deodorized aqueous polymer dispersions which are obtainable by adding the zinc salt of ricinoleic acid and/or the zinc salt of abietic acid or analogous resin acids and/or further zinc salts of other saturated or unsaturated hydroxylated fatty acids having 16 or more C atoms. However, the disadvantage of this procedure is that, owing to an additional electrolyte load, it adversely affects the stability of the aqueous polymer dispersion.

The adsorbent effect of adsorbents with respect to volatile organic substances is known. WO-A 98/11156 describes a process in which the addition of even small amounts (from 0.1 to 20% by weight, based on polymeric components of the dispersion) of active carbon to polymer dispersions is capable of binding the odor-forming, volatile impurities so strongly that they are virtually no longer perceptible both in the polymer dispersions and in the products produced using the polymer dispersions. The disadvantage of this process is that, for effective odor reduction, the residence time of the active carbon is up to several hours and then as a rule (in particular for pigmented systems, for example emulsion paints) the dispersion has to be filtered for further use. This is disadvantageous both from the economic point of view and from the ecological point of view, especially since the question of the disposal of the contaminated active carbon filtered off remains open.

Aqueous styrene/butadiene polymer dispersions are two-phase systems which consist of an aqueous phase and a polymer phase. Both the dispersed polymer particles and the aqueous dispersing medium are available as possible locations for the presence of the components having an intense odor. A partition equilibrium is established between these two phases. The disadvantage of the known methods of reducing the amount of volatile components in aqueous polymer dispersions is that they include essentially either only the aqueous dispersing medium or only the polymer particles. This means that a significant total reduction of the amount of volatile components in the aqueous polymer dispersion takes place essentially under diffusion control (repeated adjustment of the partition equilibrium). Presumably the unsatisfactory rate of reduction of the amount of volatile odor substances in aqueous polymer dispersions for use in the known processes can be attributed.

DE-A 19853421 discloses a process for reducing the odor emission of aqueous vinylaromatic/1,3-diene copolymer dispersions, in which acrylate monomers are preferably added toward the end of the copolymerization. However, this procedure is not capable of eliminating all odor substances; in particular, evidently thermal decomposition products of the vinylaromatics and dienes are not eliminated.

SUMMARY OF THE INVENTION

Surprisingly, it was found that deodorization of both the odor substances present in the aqueous phase and those present in the polymer phase takes place if alkyl esters of unsaturated carboxylic acids and vinyl esters of aliphatic carboxylic acids are added to the reaction mixture in one step or in two successive steps toward the end of the main polymerization.

The present invention relates to a process for reducing the odor emission of aqueous vinylaromatic/1,3-diene copolymer dispersions and of redispersion powders obtainable therefrom by drying, by emulsion polymerization of a mixture containing at least one vinylaromatic and at least one 1,3-diene in the presence of one or more surfactant substances and optionally drying of the polymer dispersion obtained thereby, wherein 0.01% to 15.0% by weight of one or more monomers selected from the group consisting of the branched or straight-chain alkyl esters having 1 to 8 C atoms in the alkyl radical of monounsaturated monocarboxylic acids or dicarboxylic acids and 0.01% to 15.0% by weight of one or more monomers selected from the group consisting of the vinyl esters of branched or straight-chain aliphatic carboxylic acids having 1 to 10 C atoms are added in one step or in two successive steps toward the end of the polymerization, when the total content of free monomers in the aqueous polymer dispersion is in the range from $\geq 0$ to $\leq 20\%$ by weight, it also being possible optionally to add the vinyl ester fraction as early as the beginning of or during the polymerization, and the data in % by weight being based in each case on the polymer content of the dispersion.

Suitable vinylaromatics are styrene and methylstyrene, styrene preferably being copolymerized. Examples of 1,3-dienes are 1,3-butadiene and isoprene, 1,3-butadiene being preferred. In general, 20% to 80% by weight of vinylaromatic and 20% to 80% by weight of 1,3-diene are copolymerized, it being possible optionally also to copolymerize further monomers, and the data in % by weight adding up in each case to 100% by weight.

Examples of further monomers, which are optionally copolymerized in an amount of 0.1% to 30% by weight, are monomers copolymerizable with vinylaromatics and 1,3-dienes, such as ethylene, vinyl chloride, (meth)acrylates of alcohols having 1 to 15 C atoms, optionally vinyl esters of straight-chain or branched carboxylic acids having 1 to 15 C atoms, or auxiliary monomers, such as ethylenically unsaturated monocarboxylic acids and dicarboxylic acids, ethylenically unsaturated carboxamides and carbonitriles, monoesters and diesters of fumaric acid and maleic acid, maleic anhydride, ethylenically unsaturated sulfonic acids, polyethylenically unsaturated comonomers or post crosslinking comonomers, comonomers having epoxy functional groups, comonomers having silicon functional groups, and monomers having hydroxyl or CO groups. Suitable comonomers and auxiliary monomers are described, for example, in WO-A 99/16794, the relevant disclosure of which is herewith incorporated by reference into this application.

Preferred alkyl esters selected from the group consisting of the branched or straight-chain alkyl esters having 1 to 8 C atoms in the alkyl radical of monounsaturated monocarboxylic acids or dicarboxylic acids are the alkyl esters of acrylic acid, methacrylic acid, fumaric acid, maleic acid or itaconic acid or mixtures thereof. Methyl methacrylate, methyl acrylate, n-butyl methacrylate, n-butyl acrylate, ethyl methacrylate, ethyl acrylate, 2-ethylhexyl methacrylate, 2-ethylhexyl acrylate, diisopropyl fumarate, diethyl fumarate or mixtures thereof are particularly preferred. Methyl methacrylate and n-butyl acrylate are most preferred.

Preferred vinyl esters from the group consisting of the vinyl esters of branched or straight-chain aliphatic carboxylic acids having 1 to 10 C atoms are vinyl acetate, vinyl pivalate, vinyl ethylhexanoate, vinyl esters of alpha-branched monocarboxylic acids having 9 or 10 C atoms, such as VeoVa 9 and VeoVa 10 (tradenames of Shell). Vinyl acetate is particularly preferred.

The preparation by the emulsion polymerization process is carried out at 20° C. to 95° C., preferably 60° C. to 95° C. The initiation of the polymerization is effected with the initiators or redox initiator combinations customarily used for the emulsion polymerization, for example hydroperoxides, such as tert-butyl hydroperoxide, tert-butyl peroxopivalate, cumyl hydroperoxide, or isopropylbenzyl monohydroperoxide, azo compounds, such as azobisisobutyronitrile, and inorganic initiators, such as the sodium, potassium and ammonium salts of peroxodisulfuric acid. These initiators are used in general in an amount of 0.05% to 3% by weight, based on the total weight of the monomers. Combinations of these initiators in combination with reducing agents are used as redox initiators. Suitable reducing agents are the sulfites and bisulfites of the alkali metals and of ammonium, for example sodium sulfite, the derivatives of sulfoxylic acid, such as zinc or alkali metal formaldehyde sulfoxylates, such as sodium hydroxymethanesulfonate (Rongalith), and ascorbic acid. The amount of reducing agent is preferably 0.01% to 5.0% by weight, based on the total weight of the monomers.

The polymerization batch is stabilized by means of protective colloids and/or emulsifiers. Suitable protective colloids are completely hydrolyzed and partially hydrolyzed polyvinyl acetates. Partially hydrolyzed polyvinyl acetates which have been rendered hydrophobic are also suitable, it being possible to impart hydrophobic properties, for example, by copolymerization with isopropenyl acetate, ethylene or vinyl esters of saturated alpha-branched monocarboxylic acids having 5 to 11 C atoms. Further examples are polyvinylpyrrolidones; polysaccharides in water-soluble form, such as starches (amylose and amylopectin), celluloses and their carboxymethyl, methyl, hydroxyethyl or hydroxypropyl derivatives; proteins, such as casein or caseinate, soya protein, gelatin; lignin sulfonates, synthetic polymers, such as poly(meth)acrylic acid, copolymers of (meth)acrylates with comonomer units having carboxyl functions, poly(meth)acrylamide, polyvinylsulfonic acids and their water-soluble copolymers; melamine formaldehyde sulfonates, naphthalene formaldehyde sulfonates, styrene/maleic acid and vinyl ether/maleic acid copolymers, and dextrins, such as yellow dextrin.

These partially hydrolyzed polyvinyl acetates and partially hydrolyzed polyvinyl acetates which have been rendered hydrophobic are preferred. Partially hydrolyzed polyvinyl acetates having a degree of hydrolysis of 80 to 95 mol % and a Höppler viscosity (4% strength aqueous solution, DIN 53015, Höppler method at 20° C.) of 1 to 30 mpas, preferably 2 to 15 mpas, are particularly preferred.

Suitable emulsifers are anionic or nonionic emulsifiers or mixtures thereof, for example:

1) alkylsulfates, particularly those having a chain length of 8 to 18 C atoms, alkyl and alkylaryl ether sulfates having 8 to 18 C atoms in the hydrophobic radical and 1 to 50 ethylene oxide units.
2) Sulfonates, particularly alkanesulfonates having 8 to 18 C atoms, alkylarylsulfonates having 8 to 18 C atoms, esters and monoesters of sulfosuccinic acid with monohydric alcohols or alkylphenols having 4 to 15 C atoms in the alkyl radical; these alcohols or alkylphenols can optionally also be ethoxylated with 1 to 40 ethylene oxide units.
3) Partial esters of phosphoric acid and their alkali metal and ammonium salts, particularly alkyl and alkylaryl phosphates having 8 to 20 C atoms in the organic radical, alkyl ether and alkylaryl ether phosphates having 8 to 20 C atoms in the alkyl or alkylaryl radical and 1 to 50 EO units.
4) Alkyl polyglycol ethers, preferably having 8 to 40 EO units and alkyl radicals having 8 to 20 C atoms.
5) Alkylaryl polyglycol ethers, preferably having 8 to 40 EO units and 8 to 20 C atoms in the alkyl and aryl radicals.

6) Ethylene oxide/propylene oxide (EO/PO) block copolymers, preferably having 8 to 40 EO or PO units.

The surfactant protective colloids and emulsifiers are generally added in a total amount of 1% to 15% by weight, based on the total weight of the monomers, during the polymerization. Preferably, the amount of surfactant substances is initially introduced or some of it is initially introduced and the remainder is metered in after initiation of the polymerization. The vinylaromatic/1,3-diene monomers and any further comonomers and auxiliary monomers are preferably initially introduced altogether or initially introduced in portions and the remainder metered in after initiation of the polymerization.

These alkyl esters and vinyl esters can be added as such or in aqueous emulsion, separately or as a mixture, the added amount in each case preferably being 0.1% to 5% by weight, based on the polymer content of the dispersion. The alkyl esters and vinyl esters are generally added toward the end of the polymerization when the total content of free monomers in the aqueous polymer dispersion is in the range from $\geq 0$ to $\leq 20\%$ by weight, or, expressed otherwise, the conversion of the total amount of monomers used is in the range between $\geq 80\%$ to $\leq 100\%$. Preferably, the alkyl esters and vinyl esters are added when the total content of free monomers in the aqueous polymer dispersion has fallen to the range from 5% to 15% by weight, based on the polymer content of the dispersion, which corresponds to a conversion of 85% to 95%. The addition can be effected batchwise or by means of continuous metering, the aftertreatment being carried out under polymerization conditions at a temperature of 20° C. to 95° C., preferably 60° C. to 95° C. Optionally, it is also possible to adopt a procedure in which the vinyl ester fraction is added before or during the polymerization and the alkyl ester fraction is added only toward the end of the polymerization. After the addition of the alkyl esters and vinyl esters, the polymerization is continued until no further monomer conversion is detectable, usually over a period of 15 to 60 minutes.

Optionally, a treatment by means of the conventional, physical and chemical aftertreatment methods described in the prior art, for example by chemical methods, such as post polymerization, preferably by means of redox initiators, such as, for example, a tert-butyl hydroperoxide/Rongalith mixture and the addition of equimolar amounts of butyl acrylate, based on residual styrene, may follow as final process step. Alternatively or in addition, physical methods, such as distillation under reduced pressure (vacuum treatment) or the passage of inert gases, such as nitrogen or steam, can be used.

Most preferred is a process in which a) toward the end of the polymerization, when the total content of free monomers in the aqueous polymer dispersion is in the range from $\geq 0$ to $\leq 20\%$ by weight, first 0.01% to 15.0% by weight of one or more monomers selected from the group consisting of the branched or straight-chain alkyl esters having 1 to 8 C atoms in the alkyl radical of monounsaturated monocarboxylic or dicarboxylic acids are added and thereafter b) when the total content of free monomers in the aqueous polymer dispersion is in the range from $\geq 0$ to $\leq 500$ ppm, 0.01% to 15.0% by weight of one or more monomers selected from the group consisting of the vinyl esters of branched or straight-chain aliphatic carboxylic acids having 1 to 10 C atoms are added. The data in % by weight is based on the polymer content of the dispersion and the data in ppm is based on the total weight of the dispersion.

The addition of the alkyl esters in step a) is preferably effected when the total content of free monomers in the aqueous polymer dispersion, based on the polymer content of the dispersion, has fallen to the range from 5% to 15% by weight, which corresponds to a conversion of 85% to 95%. The addition can be effected batchwise or by means of continuous metering, the aftertreatment in step a) being carried out under polymerization conditions at a temperature of 20° C. to 95° C., preferably 60° C. to 95° C. After the addition of the alkyl esters, the polymerization is continued until monomer conversion is no longer detectable, usually over a period of 15 to 60 minutes.

In this phase of the process, between step a) and b), the content of residual monomers, in particular residual styrene, can optionally be further reduced by means of the conventional, physical and chemical aftertreatment methods described in the prior art. An example of this is by chemical methods, such as post polymerization, preferably by means of redox initiators, such as, for example, a tert-butyl hydroperoxide/Rongalith mixture and the addition of equimolar amounts of butyl acrylate, based on residual styrene. Alternatively or in addition, the residual monomer content can be reduced by means of physical methods, such as distillation under reduced pressure (vacuum treatment) or passage of inert gases, such as nitrogen or steam. Preferably, the residual monomer content is decreased to the desired value of not more than 500 ppm, preferably $\geq 0$ to 50 ppm, by vacuum treatment.

In the most preferred embodiment, the vinyl ester addition is effected after step a), when the content of free vinylaromatic and 1,3-diene in the aqueous polymer dispersion has fallen to the range from $\geq 0$ to 500 ppm, preferably $\geq 0$ to 50 ppm, based on the polymer content of the dispersion. For this purpose, the vinyl ester fraction, optionally together with further initiator, is added in step b). The addition can be effected batchwise or by means of continuous metering. If further initiator is added, both the conventional thermal free radical initiators and redox initiator combinations, as described above for the emulsion polymerization, are suitable. The amount of initiator used is then 1% to 10% by weight and, if this is used in combination with a reducing agent, the amount thereof is likewise 1% to 10% by weight, based in each case on the added amount of vinyl ester. The aftertreatment in step b) is carried out at a temperature of 20° C. to 95° C., preferably 60° C. to 95° C., until monomer conversion is no longer detectable, usually over a period of 15 to 60 minutes.

Any residues of vinyl ester which are still present can be reduced after step b) by means of post polymerization, preferably in the presence of a redox initiator mixture, for example a tert-butyl hydroperoxide/Rongalith mixture, and/or removed by means of physical methods, such as distillation under reduced pressure or passage of inert gas, for example by stripping with steam.

The aqueous dispersions obtainable thereby have a solids content of 30% to 75% by weight, preferably of 40% to 65% by weight.

For the preparation of the polymer powders redispersible in water, the aqueous dispersions are dried, for example by means of fluidized-bed drying, freeze-drying or spray-drying. Preferably, the dispersions are spray-dried. The spray-drying is effected in conventional spray-drying units, making it possible to effect the atomization by means of airless nozzles, binary nozzles or multi-medium nozzles or with a rotating disc. The outlet temperature is generally chosen in the range from 55° C. to 100° C., preferably 70° C. to 90° C., depending on the unit, Tg of the resin and desired degree of drying.

The total amount of protective colloid before the drying process should preferably be at least 10% by weight, based on the amount of polymer. To ensure the redispersibility, it is necessary as a rule to add further protective colloids as an atomizing aid to the dispersion before the drying. As a rule, the atomizing aid is used in an amount of 5% to 25% by weight, based on the polymeric components of the dispersion.

Suitable atomizing aids are partially hydrolyzed polyvinyl acetates; polyvinylpyrrolidones; polysaccharides in water-soluble form, such as starches (amylose and amylopectin), celluloses and their carboxymethyl, methyl, hydroxyethyl and hydroxypropyl derivatives; proteins, such as casein or caseinate, soya protein, gelatin; lignin sulfonates; synthetic polymers, such as poly(meth)acrylic acid, copolymers of (meth)acrylates with comonomer units having carboxyl functions, poly(meth)acrylamide, polyvinylsulfonic acids and their water-soluble copolymers; melamine formaldehyde sulfonates, naphthalene formaldehyde sulfonates, and styrene/maleic acid and vinyl ether/maleic acid copolymers. Preferred atomizing aids are partially hydrolyzed polyvinyl acetates having a degree of hydrolysis of 80 to 95 mol % and a Höppler viscosity of 1 to 30 mPas, which can optionally be modified with isopropenyl acetate or vinyl ether units.

During the atomization, a content of up to 1.5% by weight, based on the base polymer, of antifoam has often proven advantageous. To increase the shelflife by improving the stability to blocking, in particular in the case of powders having a low glass transition temperature, an antiblocking agent (anticaking agent), preferably up to 30% by weight, based on the total weight of the polymeric components, may be added to the powder obtained. Examples of antiblocking agents are Ca or Mg carbonate, talc, gypsum, silica, or silicates having particle sizes preferably in the range from 10 nm to 10 μm.

To improve the performance characteristics, further additives may be added during the atomization. Further components of dispersion powder compositions, contained in preferred embodiments, are, for example, pigments, fillers, foam stabilizers and water repellents.

Surprisingly, it was found that the deodorization of the odor emitters takes place both in the aqueous and in the polymer phase of the dispersion. Advantageously, even small amounts of alkyl esters and vinyl esters are sufficient for a deodorizing effect, so that the performance characteristics of the aqueous polymer dispersion are in general not adversely affected by the addition. Neither the stability of the disperse distribution nor the suitability of the dispersion for subsequent spray-drying is adversely affected.

The polymer dispersions and the dispersion powders prepared therefrom by drying and having reduced odor emission can be used in a conventional manner, known to a person skilled in the art, for industrial products, for example as a formulation component in combination with inorganic, hydraulically setting binders in construction adhesives, renders, filling compounds, floor filling compounds, joint mortars, plaster and paints and as sole binders for coating materials and adhesives and as coating materials and binders for textiles and paper.

DETAILED DESCRIPTION OF PREFERRED EMBODIMENTS

The present invention will now be further illustrated by reference to the following Examples, which are not to be deemed limitative of the present invention in any manner thereof.

EXAMPLE 1

In a pressure vessel (flushed with $N_2$), 6.1 kg of water, 24.6 g of Na laurylsulfate, 70.4 g of sodium pyrophosphate, 1.4 g of Na ethylenediaminetetraacetate, 107.8 g of acrylamide, 140.8 g of acrylic acid, 140.8 g of fumaric acid, 0.56 kg of styrene, 30.7 g of tertdodecyl mercaptan, 0.48 kg of 1,3-butadiene and 49.3 g of sodium persulfate were initially introduced and were heated to 80° C. while stirring. After initiation of the polymerization, a homogenous mixture of 2.7 kg of butadiene, 3.2 kg of styrene and 34.1 g of tert-dodecyl mercaptan (feed A) and an aqueous solution consisting of 553 g of water and 35.2 g of sodium persulfate (feed B) were added spatially separately, beginning at the same time, in the course of 4 h, while maintaining the 80° C. After the end of feeds A and B, the conversion in the polymerization was 92%.

The addition of 280 g of butyl acrylate (feed C) to the polymerization mixture was started at this time and was completed in the course of 20 minutes. After the end of feed C, the reaction mixture was stirred for a further 2 h at 80° C., then cooled to 60° C. and freed from residual butadiene in vacuo. The conversion in the polymerization was >99.5% by weight.

After the end of the vacuum treatment, 280 g of vinyl acetate (feed D) were added to the polymer dispersion at 60° C. in the course of 15 minutes. An aqueous solution consisting of 150 g of water and 17 g of tert-butyl hydroperoxide (feed E) and an aqueous solution consisting of 150 g of water and 17 g of Rongalith (feed F) were added simultaneously and spatially separately to the polymerization vessel, beginning at the same time and in the course of 90 minutes. Thereafter, the pH of the dispersion was adjusted to 6.5 by means of 10% strength by weight sodium hydroxide solution and the dispersion was then cooled to room temperature. An aqueous polymer dispersion with a solids content of 52.5% by weight was obtained. The amount of coagulum formed in the polymerization was less than 0.5% by weight, based on the amount of monomers to be polymerized. The glass transition temperature of the film of the aqueous polymer dispersion was −5° C.

EXAMPLE 2

In a stirred autoclave having a capacity of about 16 l, 3.4 l of demineralized water and 3.85 kg of a 20% strength by weight aqueous solution of a partially hydrolyzed polyvinyl acetate having a degree of hydrolysis of 88 mol % and a Höppler viscosity of 4 mPas (DIN 53015, Höppler method at 20° C.) for the 4% strength solution were initially introduced. The pH was adjusted to 4.0 to 4.2 with 10% strength by weight formic acid. Thereafter, evacuation was effected, flushing with nitrogen was carried out, evacuation was effected again and a mixture of 4.54 kg of styrene, 2.40 kg of 1,3-butadiene and 64.8 g of tert-dodecyl mercaptan was aspirated. After heating to 80° C., the polymerization was initiated by simultaneously feeding in two catalyst solutions, the first of which consisted of 197 g of deionized water and 66 g of a 40% strength aqueous tert-butyl hydroperoxide solution and the other of 508 g of demineralized water and 57 g of sodium formaldehyde sulfoxylate. The metering of the peroxide solution was carried out at a feed rate of 44 ml/h, and the sodium formaldehyde sulfoxylate solution was metered in at 94 ml/h. 3.5 hours after the start of the polymerization, the initially introduced monomers had undergone 90% conversion. At this time, the metering of 315 g of butyl acrylate was begun at a rate of 630 g/h. 2 hours after the end of the butyl acrylate metering, the initiator meterings were stopped, the reactor content was cooled to 60° C. and residual butadiene was removed in vacuo for a further hour. The conversion in the polymerization was >99.5% by weight.

After the end of the vacuum treatment, 280 g of vinyl acetate were added to the polymer dispersion at 60° C. in the course of 15 minutes. Thereafter, an aqueous solution consisting of 150 g of water and 17 g of tert-butyl hydroperoxide and an aqueous solution consisting of 150 g of water and 17 g of Rongalith were added spatially separately to the polymerization vessel, beginning at the same time, in the course of 90 minutes. An aqueous polymer dispersion with a solids content of 52.6% by weight was obtained. The amount of coagulum formed in the polymerization was less than 0.5% by weight, based on the amount of monomers to be polymerized. The glass transition temperature of the film of the aqueous polymer dispersion was 0° C.

200 parts by weight of a 10.3% strength by weight solution of a polyvinyl alcohol (partially hydrolyzed polyvinyl acetate, degree of hydrolysis 88 mol %, viscosity of the 4% strength solution 13 mPas), 0.84 part by weight of antifoam and 135 parts by weight of water were added to 400 parts by weight of the dispersion and thorough mixing was carried out. The dispersion was sprayed through a binary nozzle. The atomizing component used was air precompressed to 4 bar, and the drops formed were dried by the cocurrent method with air heated to 125° C. 10% of commercial antiblocking agent (mixture of calcium magnesium carbonate and magnesium hydrosilicate) was added to the dry powder obtained.

Comparative Example 3

The preparation of the dispersion was carried out analogously to Example 1, the addition of vinyl acetate being dispensed with. An aqueous polymer dispersion with a solids content of 52.0% by weight was obtained. The amount of coagulum formed in the polymerization was less than 0.5% by weight, based on the amount of monomers to be polymerized. The glass transition temperature of the film of the aqueous polymer dispersion was −6° C.

Comparative Example 4

The preparation of the dispersion was carried out analogously to Example 2, the addition of vinyl acetate being dispensed with. An aqueous polymer dispersion with a solids content of 52.0% by weight was obtained. The amount of coagulum formed in the polymerization was less than 0.5% by weight, based on the amount of monomers to be polymerized. The glass transition temperature of the film of the aqueous polymer dispersion was −1° C. All other measures for the preparation of the dispersion powder corresponded to Example 2.

Comparative Example 5

The preparation of the dispersion was carried out analogously to Example 1, neither butyl acrylate nor vinyl acetate being added, but only the vacuum treatment being carried out. An aqueous polymer dispersion with a solids content of 51.3% by weight was obtained. The amount of coagulum formed in the polymerization was less than 0.5% by weight, based on the amount of monomers to be polymerized. The glass transition temperature of the film of the aqueous polymer dispersion was −4° C.

Comparative Example 6

The preparation of the dispersion was carried out analogously to Example 2, neither butyl acrylate nor vinyl acetate being added, but only the vacuum treatment being carried out. An aqueous polymer dispersion with a solids content of 51.0% by weight was obtained. The amount of coagulum formed in the polymerization was less than 0.5% by weight, based on the amount of monomers to be polymerized. The glass transition temperature of the film of the aqueous polymer dispersion was −2° C. All other measures for the preparation of the dispersion powder corresponded to Example 2.

Testing of the polymer dispersions and redispersion powders:

Assessment of the odor from dispersion films of dispersions and redispersions of the dispersion powders: For the production of the films, about 30% strength aqueous dispersions were produced by redispersing the prepared dispersion powder in water or by diluting the polymer dispersions with water. 30% strength aqueous dispersions or redispersions of the dispersion powders from the comparative Examples served as reference substances.

For the production of films, the dispersions were cast on a silicone rubber sheet and then dried for 24 hours at 23° C. The films thus obtained and measuring 15 cm×10 cm were introduced into a 250 ml wide-necked glass bottle having a screw cap and preheated to 75° C. and were placed for 5 minutes in a drying oven heated to 75° C. They were then allowed to cool to room temperature, and the odor was assessed by eight test persons on the basis of a rating scale from 1 to 6 (odor intensity). The results of the odor test are shown in Table 1.

TABLE 1

| | Results of the Odor Test | | | | | | | | |
|---|---|---|---|---|---|---|---|---|---|
| Example | 1 (D) | 2 (D) | 2 (P) | V3 (D) | V4 (D) | V5 (D) | V5 (P) | V6 (D) | V6 (P) |
| Intensity => | | | | | | | | | |
| Test person 1 | 1 | 2 | 2 | 3 | 2 | 4 | 4 | 5 | 5 |
| Test person 2 | 2 | 1 | 3 | 3 | 4 | 5 | 4 | 6 |
| Test person 3 | 1 | 2 | 2 | 3 | 3 | 5 | 5 | 5 | 5 |
| Test person 4 | 2 | 1 | 2 | 4 | 2 | 6 | 5 | 6 | 5 |
| Test person 5 | i | 1 | 1 | 3 | 2 | 4 | 6 | 4 | 6 |
| Test person 6 | 2 | 1 | 1 | 3 | 3 | 6 | 5 | 5 | 6 |
| Test person 7 | 1 | 2 | 1 | 2 | 3 | 5 | 5 | 6 | 5 |
| Test person 8 | 2 | 2 | 2 | 3 | 2 | 5 | 6 | 6 | 6 |

D = dispersion; P - redispersion powder

The results of Table 1 show that a substantial reduction in the odor annoyance is obtained by the procedure, according to the invention, for deodorizing polymer dispersions and dispersion powders. Comparison of Example 1 with comparative Examples 3 and 5 or comparison of Example 2 with comparative Examples 4 and 6 shows that, in the aftertreatment by means of the combination of alkyl ester and vinyl ester, substantially better odor minimization results than in the aftertreatment with alkyl ester alone (comparative Examples 3 and 4) or in the case of even poorer results if the procedure was carried out only by means of vacuum treatment (comparative Examples 5/6).

Determination of the Settling Behavior of the powders (tube settling):

For the determination of the settling behavior, in each case 50 g of the dispersion powder were redispersed in 50 ml of water and then diluted to a solids content of 0.5%, and the settling height of solid of 100 ml of this redispersion was filled into a graduated tube and the settling was measured after 1 hour and 24 hours. The test results are summarized in Table 2.

Determination of the Blocking Resistance:

For the determination of the blocking resistance, the dispersion powder was introduced into an iron tube having a screw union and then loaded with a metal ram. After loading, storage was effected in a drying oven for 16 hours at 50° C. After cooling to room temperature, the powder was removed from the tube and the blocking stability was determined qualitatively by crushing the powder. The blocking stability was classified as follows:

1=very good blocking stability
2=good blocking stability
3=satisfactory blocking stability
4=not stable to blocking, powder no longer free-flowing after crushing.

The test results are summarized in Table 2.

TABLE 2

| Example | Tube settlinq 1 h/24 h [cm] | Blocking resistance |
| --- | --- | --- |
| 2 | 0.1/0.4 | 1 |
| V5 | 0.1/0.6 | 1 |
| V6 | 0.2/0.5 | 2 |

The results in Table 2 show that the powder quality does not suffer as a result of the deodorizing treatment.

Accordingly, while a few embodiments of the present invention have been shown and described, it is to be understood that many changes and modifications may be made thereunto without departing from the spirit and scope of the invention as defined in the appended claims.

What is claimed is:

1. A process for reducing the odor emission of an aqueous vinylaromatic/1,3-diene copolymer dispersion and of a water-redispersible polymer powder obtained therefrom, comprising emulsion polymerizing of a mixture containing at least one vinylaromatic and at least one 1,3-diene in the presence of at least one surfactant substance;

adding to the dispersion 0.01% to 15.0% by weight of at least one monomer selected from the group consisting of branched alkyl esters having 3 to 8 C atoms in the alkyl radical and straight-chain alkyl esters having 1 to 8 C atoms in the alkyl radical of monounsaturated monocarboxylic acids and monounsaturated dicarboxylic acids and adding to the dispersion 0.01% to 15.0% by weight of at least one monomer selected from the group consisting of vinyl esters of branched aliphatic carboxylic acids having 1 to 10 C atoms and vinyl esters of straight-chain aliphatic carboxylic acids having 1 to 10 C atoms;

wherein said additions occurs in a manner selected from the group consisting of in one step and in two successive steps toward an end of the polymerizing, when a total content of free monomers in the aqueous polymer dispersion is in a range from >0 to ≦20% by weight; and wherein the data in % by weight is based in each case on the total polymer content of the dispersion.

2. The process as claimed in claim 1, wherein a) toward the end of the polymerizing, when the total content of free monomers in the aqueous copolymer dispersion is in the range from >0 to ≦20% by weight, first 0.01% to 15.0% by weight of at least one monomer selected from the group consisting of branched alkyl esters having 3 to 8 C atoms in the alkyl radical and straight-chain alkyl esters having 1 to 8 C atoms in the alkyl radical of monounsaturated monocarboxylic acids and monounsaturated dicarboxylic acids are added and thereafter b) when the total content of free monomers in the aqueous copolymer dispersion is in the range of from >0 to ≦500 ppm, adding 0.01% to 15.0% by weight of at least one monomer selected from the group consisting of vinyl esters of branched aliphatic carboxylic acids having 1 to 10 C atoms and vinyl esters of straight-chain aliphatic carboxylic acids having 1 to 10 C atoms;

the data in % by weight being based on the polymer content of the dispersion and the data in ppm being based on the total weight of the dispersion.

3. The process as claimed in claim 1, wherein 20% to 80% by weight of vinylaromatic and 20% to 80% by weight of 1,3-diene in combination with 0.1% to 30% by weight of further monomers, are copolymerized;

the data in % by weight adding up in each case to 100% by weight.

4. The process as claimed in claim 1, comprising using an alkyl ester which is at least one alkyl ester of an acid selected from the group consisting of acrylic acid, methacrylic acid, fumaric acid, maleic acid and itaconic acid.

5. The process as claimed in any of claim 1, wherein the vinyl ester used is at least one vinyl ester selected from the group consisting of vinyl acetate, vinyl pivalate, vinyl ethylhexanoate, and a vinyl ester of alpha-branched monocarboxylic acids having 9 to 10 C atoms.

6. The process as claimed in claim 1, wherein the addition of the alkyl esters is carried out in a manner selected from the group consisting of batchwise and by continuous metering, and the polymerizing is continued at a temperature of 20° C. to 95° C. until monomer conversion is no longer detectable.

7. The process as claimed in claim 2, wherein the vinyl ester fraction is added together with further initiator; and in step b), an aftertreatment is carried out at a temperature of 20° C. to 95° C. until monomer conversion is no longer detectable.

8. The process as claimed in claim 2, wherein, between step a) and b), a content of residual monomers is reduced to a desired value of not more than 500 ppm by means of post polymerization and by means of a physical method, selected from the group consisting of distillation under reduced pressure, and passage of inert gases.

9. The process as claimed in claim 2, wherein, after completion of step b), any vinyl ester residues present are removed by means of post polymerization and by a physical method selected from the group consisting of distillation under reduced pressure, and passage of inert gas.

10. The process as claimed in claim 1, further comprising drying the aqueous copolymer dispersion obtained thereby by a method selected from the group consisting of fluidized-bed drying, freeze-drying and spray-drying, for a preparation of polymer powders redispersible in water.

11. An aqueous dispersion or water-redispersible polymer powder comprising a formulation component in combination with inorganic, hydraulically setting binders in construction adhesives, renders, filling compounds, floor filling compounds, joint mortars, plaster and paints, produced by a process as claimed in claim 1.

12. An aqueous dispersion or water-redispersible polymer powder comprising a sole binder for coating materials and adhesives, produced by a process as claimed in claim 1.

13. An aqueous dispersion or water-redispersible polymer powder comprising coating materials and binders for textiles and paper, produced by a process as claimed in claim 1.

14. The process as claimed in claim 1, further comprising drying of the aqueous copolymer dispersion obtained thereby in order to produce the water redispersible polymer powder.

15. The process as claimed in claim 1, further comprising adding a vinyl ester fraction in a manner selected from the group consisting of as early as the beginning of the polymerizing and during the polymerizing.

* * * * *